United States Patent
Shatzkamer et al.

(10) Patent No.: US 9,413,860 B2
(45) Date of Patent: *Aug. 9, 2016

(54) SYSTEM AND METHOD FOR TRANSPORTING DIGITAL RADIO SIGNAL STREAMS IN A SMALL CELL NETWORK ENVIRONMENT

(71) Applicant: CISCO TECHNOLOGY, INC., San Jose, CA (US)

(72) Inventors: Kevin D. Shatzkamer, Hingham, MA (US); Ashish Dalela, Bangalore (IN); Monique J. Morrow, Zurich (CH); Peter Christian Tomsu, Leitzersdorf (AT); Michael P. Hammer, Reston, VA (US); Vojislav Vucetic, Holmdel, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,107

(22) Filed: Jun. 27, 2014

(65) Prior Publication Data

US 2014/0307627 A1    Oct. 16, 2014

Related U.S. Application Data

(63) Continuation of application No. 13/336,167, filed on Dec. 23, 2011, now Pat. No. 8,824,478.

(51) Int. Cl.
*H04W 4/00* (2009.01)
*H04L 29/06* (2006.01)
*H04L 12/28* (2006.01)

(52) U.S. Cl.
CPC ............ *H04L 69/22* (2013.01); *H04L 12/2865* (2013.01); *H04J 2203/003* (2013.01); *H04J 2203/0046* (2013.01)

(58) Field of Classification Search
CPC ................. H04J 2203/0051; H04J 2203/0046; H04J 2203/003; H04L 29/02
See application file for complete search history.

(56) References Cited

U.S. PATENT DOCUMENTS

| | | | |
|---|---|---|---|
| 6,018,521 | A | 1/2000 | Timbs et al. |
| 6,430,193 | B1 | 8/2002 | Raissinia et al. |
| 6,577,642 | B1 | 6/2003 | Fijolek et al. |
| 7,321,571 | B2 | 1/2008 | Schnack et al. |

(Continued)

OTHER PUBLICATIONS

USPTO Oct. 17, 2014 Notice of Allowance from U.S. Appl. No. 13/492,897.

(Continued)

*Primary Examiner* — Marcus R Smith
*Assistant Examiner* — Dewanda Samuel
(74) *Attorney, Agent, or Firm* — Patent Capital Group

(57) ABSTRACT

A method is provided in one example embodiment that includes receiving a radio signal stream, segmenting the radio signal stream based on a control word in the radio signal stream, mapping the segmented radio signal stream to a service class, transporting the segmented radio signal stream in packets through channels over a backhaul link, and maintaining the order of the radio signal stream over the backhaul link. In more particular embodiments, the backhaul link may use a DOCSIS link, the radio signal stream can be received using a Common Public Radio Interface, and the radio signal stream may include sub-streams transported through segmented channels over the backhaul link.

20 Claims, 8 Drawing Sheets

(56) References Cited

U.S. PATENT DOCUMENTS

| | | |
|---|---|---|
| 7,602,751 B2 | 10/2009 | Ebert et al. |
| 7,688,835 B2 * | 3/2010 | Kotzin et al. .................. 370/401 |
| 8,014,325 B2 | 9/2011 | Izumikawa et al. |
| 8,018,910 B2 | 9/2011 | Jiang et al. |
| 8,134,979 B2 | 3/2012 | Jin et al. |
| 8,160,019 B2 | 4/2012 | Labedz |
| 8,213,993 B2 * | 7/2012 | Nino et al. .................... 455/561 |
| 8,358,577 B1 | 1/2013 | Khanka et al. |
| 8,422,884 B2 | 4/2013 | Mae |
| 8,670,772 B2 | 3/2014 | Roddy et al. |
| 2003/0035420 A1 | 2/2003 | Niu |
| 2005/0088012 A1 | 4/2005 | Yoshida |
| 2005/0238049 A1 * | 10/2005 | Delregno ............ H04L 12/2889 370/466 |
| 2007/0133477 A1 | 6/2007 | Ebert et al. |
| 2008/0192773 A1 | 8/2008 | Ou et al. |
| 2009/0059790 A1 | 3/2009 | Calvert et al. |
| 2009/0109907 A1 * | 4/2009 | Tsai et al. ..................... 370/329 |
| 2010/0074121 A1 | 3/2010 | Sakama |
| 2010/0128676 A1 | 5/2010 | Wu et al. |
| 2010/0131702 A1 | 5/2010 | Wong et al. |
| 2010/0234061 A1 | 9/2010 | Khandekar et al. |
| 2010/0239256 A1 | 9/2010 | Zheng |
| 2010/0296469 A1 | 11/2010 | Zhou et al. |
| 2011/0128950 A1 * | 6/2011 | Tomita et al. .................. 370/339 |
| 2011/0158332 A1 | 6/2011 | Wu et al. |
| 2011/0201268 A1 | 8/2011 | He et al. |
| 2011/0222491 A1 * | 9/2011 | Vajapeyam ........... H04L 1/0038 370/329 |
| 2011/0223962 A1 | 9/2011 | Kuwahara et al. |
| 2011/0236024 A1 | 9/2011 | Mao |
| 2011/0243071 A1 | 10/2011 | Wu et al. |
| 2011/0255497 A1 | 10/2011 | Pan et al. |
| 2011/0261812 A1 | 10/2011 | Kini et al. |
| 2011/0269405 A1 | 11/2011 | Bjorken |
| 2012/0063314 A1 | 3/2012 | Pignataro et al. |
| 2013/0034358 A1 * | 2/2013 | Sung .................. H04W 88/085 398/115 |
| 2013/0116011 A1 | 5/2013 | Lee et al. |
| 2013/0163524 A1 | 6/2013 | Shatzkamer |

OTHER PUBLICATIONS

U.S. Appl. No. 14/318,107, filed Jun. 27, 2014, entitled "System and Method for Transporting Digital Radio Signal Streams in a Small Cell Network Environment ," Inventors: Kevin Shatzkamer, et al.

U.S. Appl. No. 13/492,897, entitled "System and Method for Transporting Digital Baseband Streams in a Network Environment," filed Jun. 10, 2012; Inventors: Ashish Dalela, et al.

USPTO Sep. 19, 2013 Non-Final Office Action from U.S. Appl. No. 13/492,897.

USPTO Jan. 29, 2014 Final Office Action from U.S. Appl. No. 13/492,897.

USPTO Jun. 2, 2014 Non-Final Office Action from U.S. Appl. No. 13/492,897.

Agilent Technologes, Inc., "Understanding the CPRI Digital Interface Standard," Feb. 6, 2006; 5 pages http://www.agilent.com/about/newsroom/tmnews/background/2006/06feb2006_bg.html.

CPRI Specification V4.2: "Common Public Radio Interface (CPRI); Interface Specification," Sep. 29, 2010; © 2009 Ericsson AB, Huawei Technologies Co. Ltd., NEC Corporation, Alcatel Lucent, and Nokia Siemens Networks GmbH & Co. KG; 113 pages http://www.cpri.info/spec.html.

ITU-T J.222.1: "Series J: Cable Networks and Transmission of Television, Sound Programme and Other Multimedia Signals; Interactive Systems for Digital Televisions Distribution; Third-Generation Transmission Systems for Interactive Cable Televisions Services—IP Cable Modems: Physical Layer Specification," International Telecommunication Union; Jul. 2007, 184 pages.

ITU-T J.222.2: "Series J: Cable Networks and Transmission of Television, Sound Programme and Other Multimedia Signals; Interactive Systems for Digital Televisions Distribution; Third-Generation Transmission Systems for Interactive Cable Televisions Services—IP Cable Modems: MAC and Upper Layer Protocols; vol. 1: Core Recommendation," International Telecommunication Union; Jul. 2007, 435 pages.

* cited by examiner

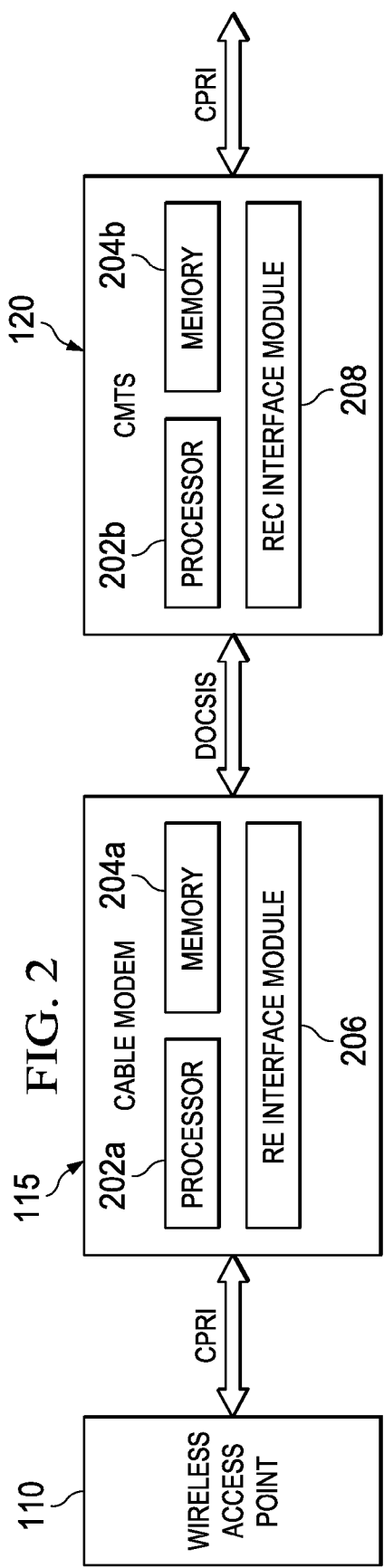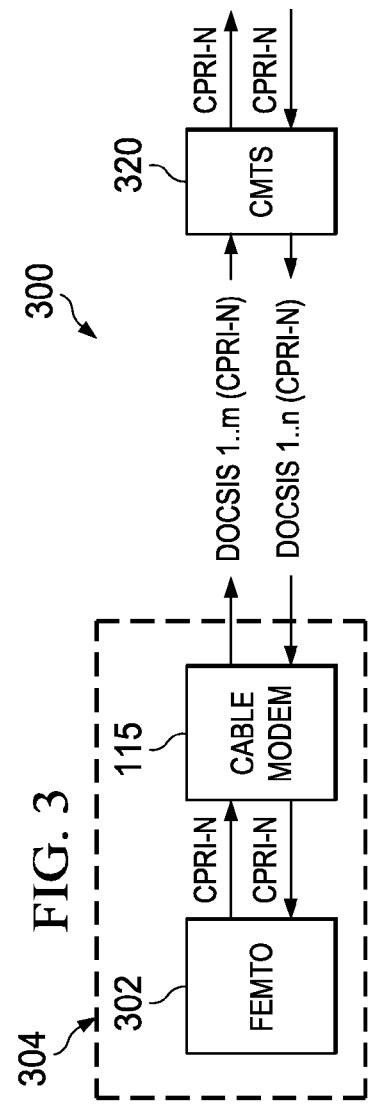

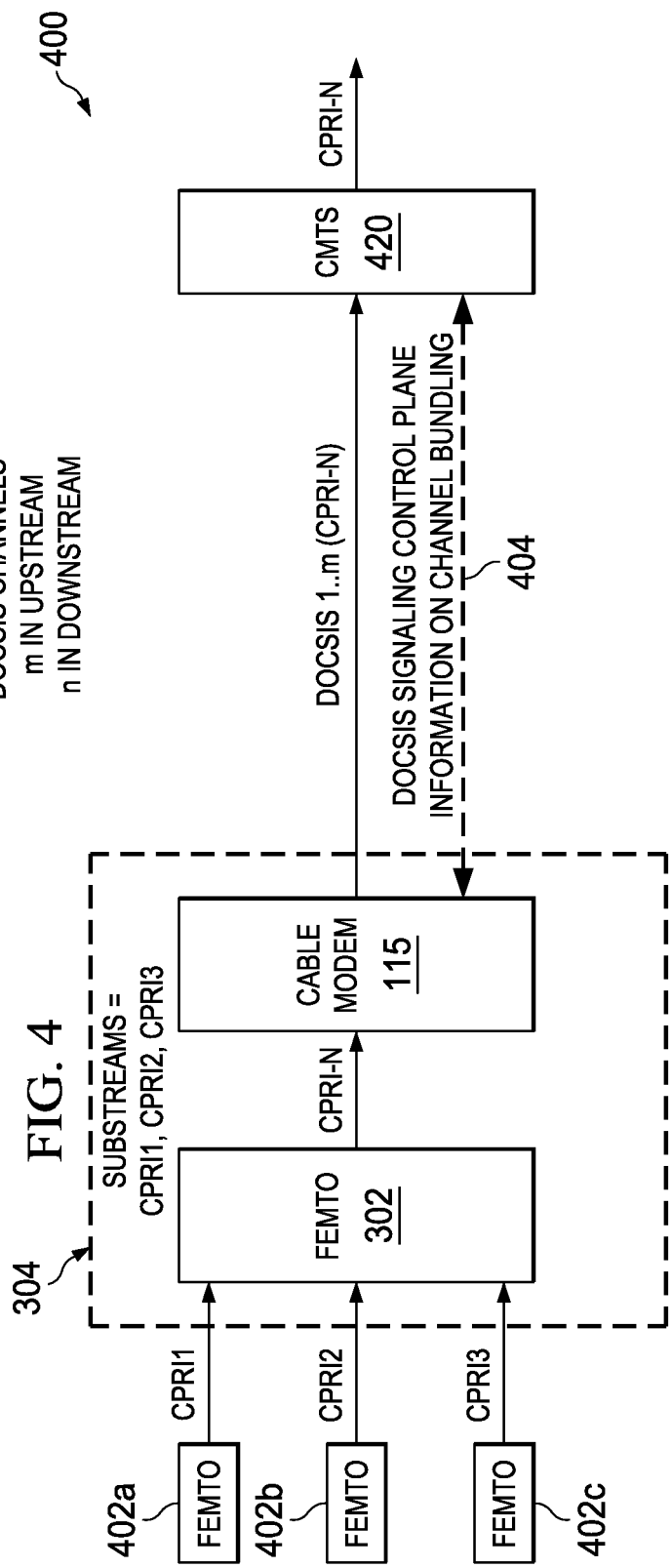

SYSTEM AND METHOD FOR TRANSPORTING DIGITAL RADIO SIGNAL STREAMS IN A SMALL CELL NETWORK ENVIRONMENT

RELATED APPLICATION

This Application is a continuation (and claims the benefit of priority under 35 U.S.C. §120) of U.S. application Ser. No. 13/336,167, filed Dec. 23, 2011, entitled "SYSTEM AND METHOD FOR TRANSPORTING DIGITAL RADIO SIGNAL STREAMS IN A SMALL CELL NETWORK ENVIRONMENT," Inventors Kevin D. Shatzkamer, et al. The disclosure of the prior application is considered part of (and is incorporated by reference in) the disclosure of this application.

TECHNICAL FIELD

This disclosure relates in general to the field of communications, and more particularly, to a system and a method for transporting digital radio signal streams in a small cell network environment.

BACKGROUND

Networking architectures have grown increasingly complex in communications environments: particularly mobile wireless environments. Cable operators are also steadily increasing their wireless service offerings, including 3G, WiFi, WiMAX picocells, and femtocells, many of which can be linked to backhaul networks using the Data Over Cable Service Interface Specification (DOCSIS). However, many challenges remain for integrating mobile wireless environments with cable networks including cost reduction, maintainability, and technology interworking.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified block diagram illustrating additional details that may be associated with potential embodiments of the communication system;

FIG. 3 is a simplified block diagram illustrating additional details that may be associated with an example use case of the communication system;

FIG. 4 is a simplified block diagram illustrating additional details that may be associated with an example use case of the communication system in which a DOCSIS control channel between a cable modem and a cable modem termination system may be used to communicate channel bundling information;

DETAILED DESCRIPTION OF EXAMPLE EMBODIMENTS

Overview

A method is provided in one example embodiment that includes receiving a radio signal stream, segmenting the radio signal stream based on a control word in the radio signal stream, mapping the segmented radio signal stream to a service class, transporting the segmented radio signal stream in packets through channels over a backhaul link, and maintaining the order of the radio signal stream over the backhaul link. In more particular embodiments, the backhaul link may use a DOCSIS link, the radio signal stream can be received using a Common Public Radio Interface, and the radio signal stream may include sub-streams transported through segmented channels over the backhaul link. In more specific instances, the method can include mapping the sub-streams transported through segmented channels into a second radio signal stream.

More specific to the quality of service (QoS) mapping function of the present disclosure, in particular embodiments, an IQ data block (e.g., representing a sampling from an LTE or WiMAX base station) can be provisioned. The IQ-data block can be indistinguishable (e.g., as representing anything other than baseband processing, and not be understood as a specific user's traffic). Embodiments of the present disclosure can identify the IQ-data block by analyzing the control bytes transmitted at the beginning of the stream. The architecture is configured to translate the variable-length IQ-data block to a realtime polling service (RTPS) class. In such an embodiment, the common Public Radio Interface (CPRI) link can appear as a single flow and is, therefore, treated as a single variable-length flow.

When the IQ data block is segmented into sub-channels, the sub-channels may appear if the CPRI link is carrying a single (radio element's) RE's multiple channels of baseband traffic, or if the CPRI link is carrying multiple RE's of baseband traffic. In such an instance embodiment, the CPRI link appears as multiple sub-flows (or sub-channels), and each sub-channel may be treated independently. In certain instances, the sub-channels share the same service flow within the DOCSIS protocol and, therefore, the same RTPS QoS class.

In one embodiment, the control word of the initial IQ-data block identifies the stream as synchronization (or timing information). In this case, the stream is treated as a fixed-length data segment, and it can be assigned a unsolicited grant service (UGS) service class to ensure elimination of overhead and priority treatment above/beyond the user baseband signaling traffic. In one embodiment, the control word of the initial IQ-data block identifies the stream as an L1 Inband Protocol. In this instance, adequate procedures can be implemented to support a High-level Data Link Control (HDLC) protocol over Ethernet/IP/Packet networks.

Example Embodiments

Figure 1:
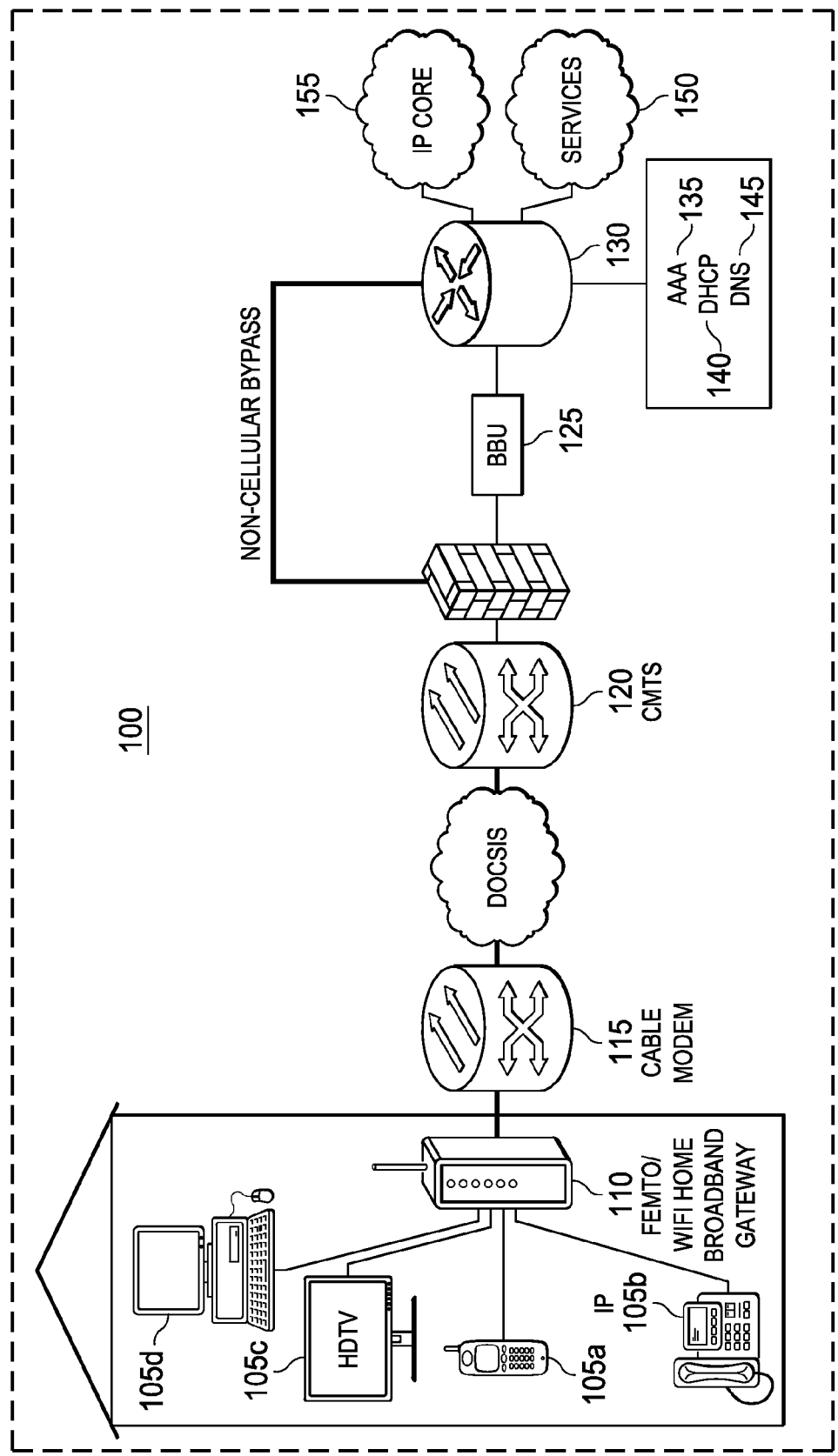
FIG. 1 is a simplified block diagram illustrating an example embodiment of a communication system in which a radio signal stream may be transported over a small cell backhaul in accordance with this disclosure.

Turning to FIG. 1, FIG. 1 is a simplified block diagram of an example embodiment of a communication system 100 in which a radio signal stream may be transported over a small cell backhaul in accordance with one embodiment of the present disclosure. Communication system 100 may include a plurality of endpoints 105a-105d, which are coupled to a wireless access point 110. Wireless access point 110 may be integrated with or coupled to a cable modem (CM) 115, which may in turn be coupled to a cable modem termination system (CMTS) 120 through a DOCSIS link, for example. CMTS 120 can be coupled to a baseband unit (BBU) 125. A packet gateway 130 may provide connectivity to other networks and services, such as authentication, authorization, and accounting (AAA) services 135, dynamic host configuration (DHCP) services 140, domain name services 145, and other cloud services 150, as well as connectivity to other networks, such as an Internet 155.

Endpoints 105a-105d may be associated with subscribers, clients, or customers wishing to access communication system 100. The term "endpoint" or "node" may be inclusive of devices used to initiate a communication, such as a computer, any type of user equipment, any type of mobile station, any type of smart phone, a personal digital assistant (PDA), a laptop or electronic notebook, a cellular telephone, an iPhone, an iPad, a Google Android phone, an Internet Protocol (IP) phone, or any other device, component, element, or object capable of initiating voice, audio, or data exchanges within communication system 100. Endpoints 105a-105d may also be inclusive of a suitable interface to the human user, such as a microphone, a display, or a keyboard or other terminal equipment. Endpoints 105a-105d may also be any device that seeks to initiate a communication on behalf of another entity or element, such as a program, a database, or any other component, device, element, or object capable of initiating a voice or a data exchange within communication system 100. Data, as used herein, refers to any type of numeric, voice, or script data, or any type of source or object code, or any other suitable information in any appropriate format that may be communicated from one point to another.

Before detailing the operations and the infrastructure of FIG. 1, certain contextual information is provided to offer an overview of the types of communications traversing communication system 100. Such information is offered earnestly and for teaching purposes only and, therefore, should not be construed in any way to limit the broad applications for the present disclosure.

DOCSIS is an international telecommunications standard, which permits the addition of high-speed data transfer to an existing cable network. DOCSIS may be deployed by operators to provide data transfer over a hybrid fiber-coaxial (HFC) infrastructure, for example. DOCSIS may deliver between 1 and m channel configurations, with maximum sustained bandwidth of m*38 Mbps (without overhead) available throughput in the downstream, and up to n channels in the upstream, with maximum sustained bandwidth of n*27 Mbps. Typically, a DOCSIS architecture includes two primary components: a cable modem located at the customer premises, and a CMTS located at the head end. Fiber optic lines can bring digital signals to nodes in the system, where they can be converted into RF channels and modem signals on coaxial trunk lines.

DOCSIS provides service classes to support Quality of Service (QoS) between a transmitter and a receiver. The DOCSIS service classes may include best effort, non-real-time polling service (NRTPS), realtime polling service (RTPS), unsolicited grant service (UGS), and unsolicited grant service with activity detection (UGS-AD).

As wireless networks continue to expand and evolve, certain implementations may provision a wireless access point (e.g., a base station) and a backhaul that uses a cable modem, which offers bi-directional data communication over an HFC infrastructure. A wireless access point, such as a microcell, picocell, femtocell, or other small cell base station, for example, is generally responsible for providing an air interface to a mobile endpoint. For example, some small cell network environments may include WiFi, WiMAX, and LTE strand-mounted systems, which rely on a DOCSIS link over an HFC infrastructure. Other examples may include an integrated DOCSIS modem with multiple SSID WiFi access points, and integrated DOCSIS modem and femtocell devices.

In other environments, a cloud radio access network (CRAN) architecture may centralize radio-processing functions to resolve some power efficiency and resource utilization concerns with many intelligent radio/cell-site architectures. In general, a CRAN architecture provides a remote radio head placed in close proximity to an antenna (or may be integrated with an antenna) and translate the radio signal into a digital bit stream, which can travel greater distances without loss. The digital signals from a remote radio head can be transmitted to a centralized baseband processing unit, which effectively shifts processing from the antenna and allows operators to pool and share processor bandwidth across remote radio heads. A controller (e.g., a base station controller or radio network controller) may also be co-located with the baseband processing to aggregate from cell sites and manage the radio access network.

Common Public Radio Interface (CPRI) is a standard for transporting digital radio signal streams (i.e., radio signals converted to a digital bit stream) in a CRAN architecture over a link between a remote radio head and a baseband processing unit. In more general CPRI terms, a remote radio head is commonly referred to as radio equipment (RE), and a baseband processing unit and/or controller is referred to as radio equipment control (REC). User-plane data, control and management (C&M) data, and synchronization signals can be exchanged between the REC and the RE. Flows can be multiplexed onto a digital serial communication line using appropriate layer 1 and layer 2 protocols. The different information flows can access layer 2 via appropriate service access points. CPRI may also be used as a link between two nodes in system architectures supporting networking. CPRI provides several different line bit rates to achieve flexibility and cost efficiency: 614.4 Mbps, 1228.8 Mbps, 2457.6 Mbps, 3072.0 Mbps, 4915.2 Mbps, 6144.0 Mbps, and 9830.4 Mbps.

In general terms, CPRI provides a basic protocol hierarchy with functions running at Layer 1 (i.e., electrical or optical transmission and time-division multiplexing (TDM)), and Layer 2. Layer 2 can include In-Phase and Quadrature (IQ) data, vendor-specific information, Ethernet, High-level Data Link Control (HDLC), L1 Inband Protocol, control and management (C&M) data, and synchronization. A basic layer 1 frame of CPRI generally consists of sixteen words, the length of which depends on the CPRI line bit rate. The first word is used as a control word, which is transmitted first. The control word can identify the type of stream (e.g., user plane, C&M, synchronization) and the number of sub-streams carried within the stream. Hence, the term 'word' represents broad terminology inclusive of any type of identifier, symbol, electronic object, signature, etc. that can be associated with a given stream. The stream itself can represent any type of data being propagated between two points.

Each IQ data block can contain user plane information in the form of IQ modulation data (i.e., digital baseband signals). The IQ data of different antenna carriers may be multiplexed with a TDM scheme onto an electrical or optical transmission line. L1 Inband protocol generally includes signaling information related to a link, directly transported by the physical layer. This information can provide system startup, link maintenance, and critical data transfer flow. C&M data may be sent as inband protocol (for time-critical signaling data) or by layer 3 protocols (not defined by CPRI) that reside on top of appropriate layer 2 protocols. CPRI can support two different layer 2 protocols for C&M data—a subset of HDLC and Ethernet. Additional C&M data can be time multiplexed with the IQ data. Additional time slots are also available for the transfer of any type of vendor specific information. Synchronization data may be used for phase and shift alignment.

The REC generally provides the network interface transport, radio base station control and management, and digital baseband processing, whereas the RE can provide the analog radio frequency functions, such as filtering, modulation, frequency conversion and amplification. The functional split between both parts is done in such a way that a generic interface based on IQ data can be defined.

In an evolved UMTS Terrestrial Radio Access Network (E-UTRAN), for example, the REC can provide access to the Evolved Packet Core for the transport of user-plane and control-plane traffic via the S1 interface, whereas the RE can serve as the air interface to the user equipment. In another example, the REC can provide access to network entities (e.g. other base stations or an ASN-GW) in a WiMAX network, whereas the RE can serve as the air interface to the subscriber station/mobile subscriber station (SS/MSS).

In accordance with embodiments described herein, a wireless access point may be configured as an RE in a CRAN architecture. Thus, a wireless access point such as wireless access point 110 in communication system 100 may receive radio signal streams from endpoints (e.g., endpoints 105a-105-d) and transport them to a centralized baseband-processing unit, such as baseband processor 125, using CPRI.

However, CPRI cannot be used to transport a radio signal stream directly over a packet-based small cell network backhaul, such as a cable network with an HFC infrastructure. However, if such data were sent over a backhaul, they generally would compete with other (best effort) traffic, where the over-the-air guaranteed bounds are not useful if a backhaul link is allowed to introduce wide variations on such metrics. Upstream QoS across a DOCSIS link, for example, can become overwhelmed with multiple active devices using less than the maximum pre-allocated backhaul bandwidth, but (taken together) they can cause congestion.

Communication system 100, though, can provide a system and method for transporting radio signal streams with an appropriate service class in a small cell network environment. In more particular embodiments, communication system 100 can provide a system and method for deploying CPRI over a small cell backhaul technology, such as DOCSIS cable modems, by determining the CPRI frame/hyperframe structure, isolating CPRI traffic into specific service classes, and encapsulating/decapsulating CPRI data to/from a DOCSIS packet, for example. Thus, an entity (either internal to an RE and/or REC or external to an RE and/or REC) may transport CPRI over a common DOCSIS backhaul.

In particular embodiments that may include deploying CPRI over DOCSIS, the number of downstream DOCSIS channels 'm' and the number of upstream DOCSIS channels 'n' may be equivalent in order to align signaling and synchronization events. Thus, in various embodiments, m and n may be defined as: m=n=23 for a CPRI bitrate of 614.4 Mbps; m=n=46 for a 1228.8 Mbps CPRI line; m=n=91 for a 2457.6 Mbps CPRI line; m=n=114 for a 3072.0 Mbps CPRI line; m=n=183 for a 4915.2 Mbps CPRI line; m=n=228 for a 6144.0 Mbps CPRI line; and m=n=365 for a 9830.4 Mbps CPRI line. Further, for a particular RE/REC pair (e.g., wireless access point 110 and baseband processor 125), both time-division duplexing (TDD) and frequency-division duplexing (FDD) radio systems may be available. For TDD systems, full duplex communication over CPRI (and thus, over DOCSIS) may not be required, as signals may be sampled either in the forward link or the reverse link, and not both simultaneously.

In certain embodiments, communication system 100 may identify an IQ data block (e.g., representing a sampling from an LTE or WiMAX base station) by analyzing the control bytes transmitted at the beginning of a stream. Communication system 100 may translate the variable-length IQ data block into an RTPS class. In such an embodiment, the CPRI link may be treated as a single, variable-length flow since the CPRI link looks like a single flow. The CPRI stream order may be maintained over multiple DOCSIS channels.

In some embodiments, an IQ data block can be segmented into sub-channels. The sub-channels may appear if a CPRI link is carrying multiple channels of a single RE, or if the CPRI link is carrying baseband traffic from multiple REs, for example. In such embodiments, the CPRI link appears as multiple sub-flows or sub-channels, and each sub-channel may be treated independently. However, all sub-channels can share the same service flow within a DOCSIS link, and therefor, the same RTPS service class. Multiple CPRI sub-stream orders may be maintained over shared DOCSIS channels. Multiple CPRI sub-streams over multiple DOCSIS channels may also be re-mapped into a single CPRI stream. CPRI streams may be mapped to DOCSIS channels based on specific markers in the stream, such as those identifying start or end of a particular AxC, synchronization or timing information, or other kinds of control information.

FIG. 2 is a simplified block diagram illustrating additional details that may be associated with potential embodiments of communication system 100. FIG. 2 includes wireless access point 110 (representative of radio equipment), cable modem 115, and CMTS 120. Cable modem 115 and CMTS 120 may each include a respective processor 202a-202b and a respective memory element 204a-204b. Moreover, cable modem 115 and CMTS 120 may each include additional hardware and/or software elements, such as RE interface module 206 and REC interface module 208. Hence, appropriate software and/or hardware may be provisioned in wireless access point 110, cable modem 115 and/or CMTS 120 to facilitate the activities discussed herein.

In one example implementation, wireless access point 110, cable modem 115, and CMTS 120 are network elements, which are meant to encompass network appliances, servers, routers, switches, gateways, bridges, loadbalancers, firewalls, base stations, access points, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In regards to the internal structure associated with communication system 100, each of wireless access point 110, cable modem 115, and/or CMTS 120 can include memory elements for storing information to be used in the operations outlined herein. Each of wireless access point 110, cable modem 115, and/or CMTS 120 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory items discussed herein (e.g., memory elements 204a-204b) should be construed as being encompassed within the broad term "memory element." The information being used, tracked, sent, or received by wireless access point 110, cable modem 115, and/or CMTS 120 could be provided in any database, register, queue, table, cache, control list, or other storage structure, all of which can be referenced at any suitable timeframe. Any such storage options may be included within the broad term "memory element" as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements (as shown in FIG. 2) can store data used for the operations described herein. This includes the memory elements being able to store software, logic, code, or processor instructions that are executed to carry out the activities described herein.

In one example implementation, wireless access point 110, cable modem 115, and/or CMTS 120 may include software modules (e.g., RE interface module 206 and/or REC interface module 208) to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of wireless access point 110, cable modem 115, and/or CMTS 120 may include a processor that can execute software or an algorithm to perform activities as discussed herein. A processor can execute any type of instructions associated with the data to achieve the operations detailed herein. In one example, the processors (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

Turning to FIG. 3, FIG. 3 is a simplified block diagram 300 illustrating additional details that may be associated with an example use case of communication system 100. FIG. 3 includes a femtocell 302, cable modem 115, and CMTS 320. In some embodiments, femtocell 302 and cable modem 115 may be integrated into a single access point 304, as illustrated in FIG. 3. As a preliminary matter, cable modem 115 may negotiate with CMTS 320 to obtain m upstream DOCSIS channels and n downstream DOCSIS channels based on the CPRI bitrate of femtocell 302 and the duplex nature of the air interface. For example, radios that implement TDD may not use timeslots for both uplink and downlink data. Consequently, full duplex communication may not be needed, and all of the traffic may be in one direction at any given moment.

In operation, femtocell 302 may provide a single CPRI stream (CPRI-N) to cable modem 115, where CPRI-N may include substreams for N femtocells (not shown in FIG. 3) or N channels of femtocell 302, for example. Cable modem 115 can transmit CPRI-N over m upstream DOCSIS channels with a particular service class by segmenting the CPRI-N stream for packetization and mapping the CPRI-N stream of data to packets. Moreover, substreams of CPRI-N may be sub-segmented across multiple shared DOCSIS channels in some embodiments, maintaining CPRI stream order over the multiple DOCSIS channels. In more particular embodiments, CPRI-N may be mapped to bundled DOCSIS channels based on a control word in CPRI-N. For example, the control word may identify CPRI-N as a single stream of variable length IQ data blocks, which cable modem 115 can treat as a single variable length flow by mapping CPRI-N to m DOCSIS channels with an RTPS service class. CMTS 320 can map the m DOCSIS channels back to a single CPRI stream (i.e., CPRI-N in FIG. 3) and transmit it to a baseband processor. Downstream traffic can be similarly mapped to n downstream DOCSIS channels, as further illustrated in FIG. 3.

FIG. 4 is a simplified block diagram 400 illustrating additional details that may be associated with an example use case of communication system 100, in which a DOCSIS control channel between a cable modem and a CMTS may be used to communicate channel bundling information. FIG. 4 includes femtocell 302, femtocells 402a-402c, cable modem 115, and CMTS 420. In some embodiments, femtocell 302 and cable modem 115 may be integrated into a single access point 304, as illustrated in FIG. 4. As a preliminary matter, cable modem 115 may negotiate with CMTS 420 to obtain m upstream DOCSIS channels and n downstream DOCSIS channels based on the CPRI bitrate of femtocell 302 and the duplex nature of the air interface.

In operation, femtocell 302 may provide a single CPRI stream (CPRI-N) to cable modem 115, but CPRI-N may carry multiple streams (i.e., substreams CPRI1-CPRI3) from femtocells 402a-402c. Cable modem 115 can transmit CPRI-N to CMTS 420 over m DOCSIS channels with a particular service class by mapping CPRI-N to DOCSIS channels based on the control word in CPRI-N. For example, the control word may identify CPRI-N as three substreams of variable length IQ data blocks. Cable modem 115 can treat each substream independently, but sharing the same service class within DOCSIS. Thus, cable modem 115 can map CPRI1-CPRI3 to m DOCSIS channels with an RTPS service class. In the upstream direction, cable modem 115 can segment CPRI-N, and CMTS 420 can re-aggregate CPRI-N and transmit CPRI-N to a baseband processor. In the downstream (not shown), CMTS 120 can segment CPRI-N into n DOCSIS channels and cable modem 115 can re-aggregate CPRI-N. The DOCSIS link between cable modem 115 and CMTS 420 can be used to provide CPRI transport, and a DOCSIS control channel 404 may be used for communicating channel bundling information between cable modem 115 and CMTS 420 to facilitate segmentation and re-assembly.

Figure 5:
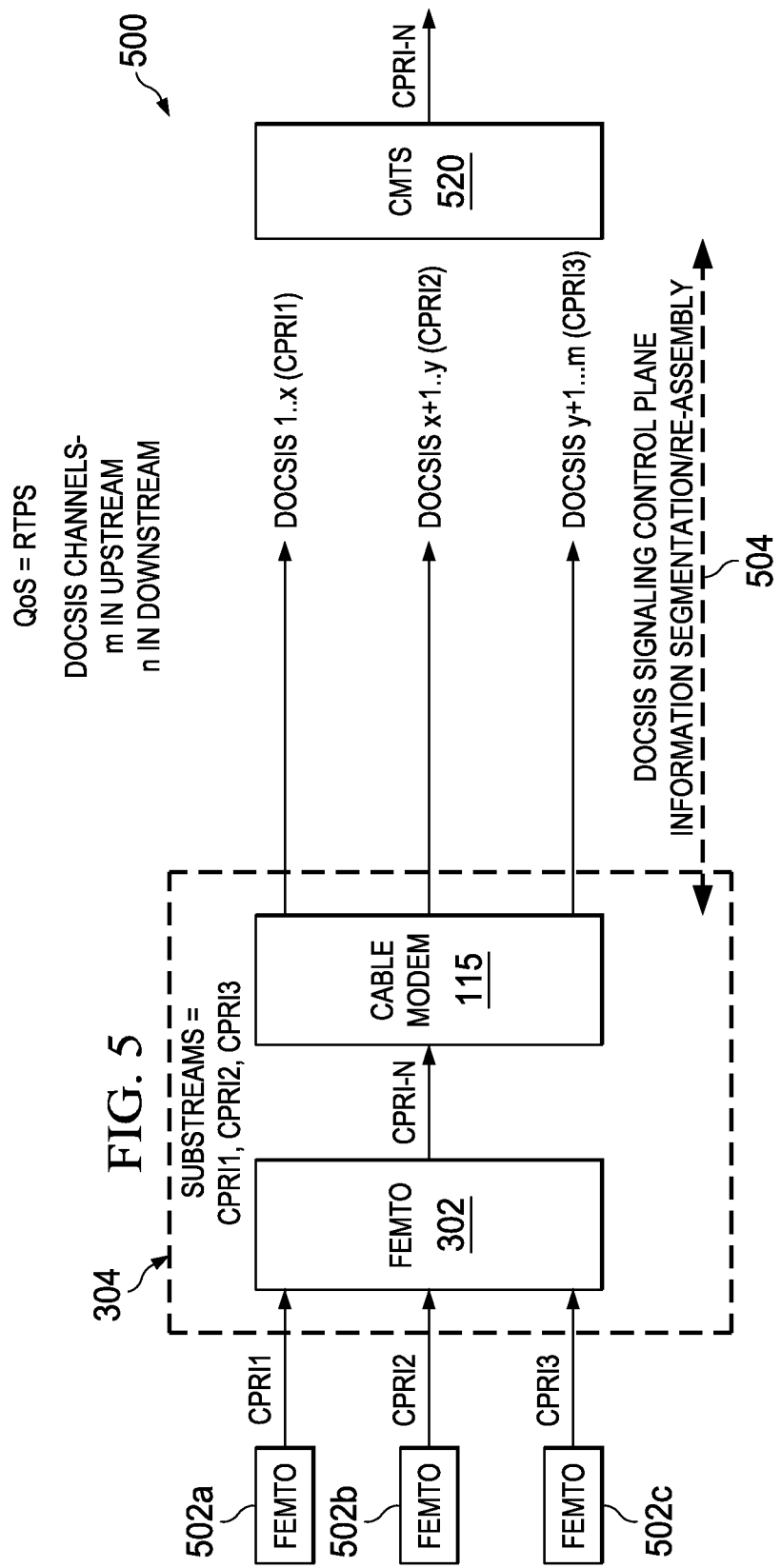
FIG. 5 is a simplified block diagram illustrating additional details that may be associated with another example use case of the communication system in which a DOCSIS control channel between a cable modem and a cable modem termination system may be used to communicate segmentation and re-assembly information.

FIG. 5 is a simplified block diagram 500 illustrating additional details that may be associated with another example use case of communication system 100, in which a DOCSIS control channel between a cable modem and a CMTS may be used to communicate segmentation and re-assembly information. FIG. 5 includes femtocell 302, femtocells 502a-502c, cable modem 115, and CMTS 520. In some embodiments, femtocell 302 and cable modem 115 may be integrated into a single access point 304, as illustrated in FIG. 5. As a preliminary matter, cable modem 115 may negotiate with CMTS 520 to obtain m upstream DOCSIS channels and n downstream DOCSIS channels based on the CPRI bitrate of femtocell 302 and the duplex nature of the air interface.

In operation, femtocell 302 may provide a single CPRI stream (CPRI-N) to cable modem 115, but CPRI-N may carry multiple streams (i.e., substreams CPRI1-CPRI3) from femtocells 502a-502c. Cable modem 115 can transmit CPRI-N to CMTS 520 over m DOCSIS channels with a particular service class by mapping CPRI-N to DOCSIS channels based on the control word in CPRI-N. For example, the control word may identify CPRI-N as three substreams of variable length IQ data blocks. Cable modem 115 can treat each substream independently, but sharing the same service class within DOCSIS. Thus, cable modem 115 can map CPRI1-CPRI3 to m upstream DOCSIS channels with an RTPS service class. For example, CPRI3 may be mapped to DOCIS channels 1 . . . x, CPRI2 mapped to DOCSIS channel x+1 . . . y, and CPRI3 mapped to DOCSIS channels y+1 . . . m. In the upstream direction, cable modem 115 can segment CPRI-N and CMTS 520 can re-aggregate CPRI-N. In the downstream (not shown), CMTS 520 can segment CPRI-N into n DOCSIS channels and cable modem 115 can re-aggregate CPRI-N. A DOCSIS channel 504 between cable modem 115 and CMTS 520 may be used for communicating segmentation/re-assembly information.

Figure 6:
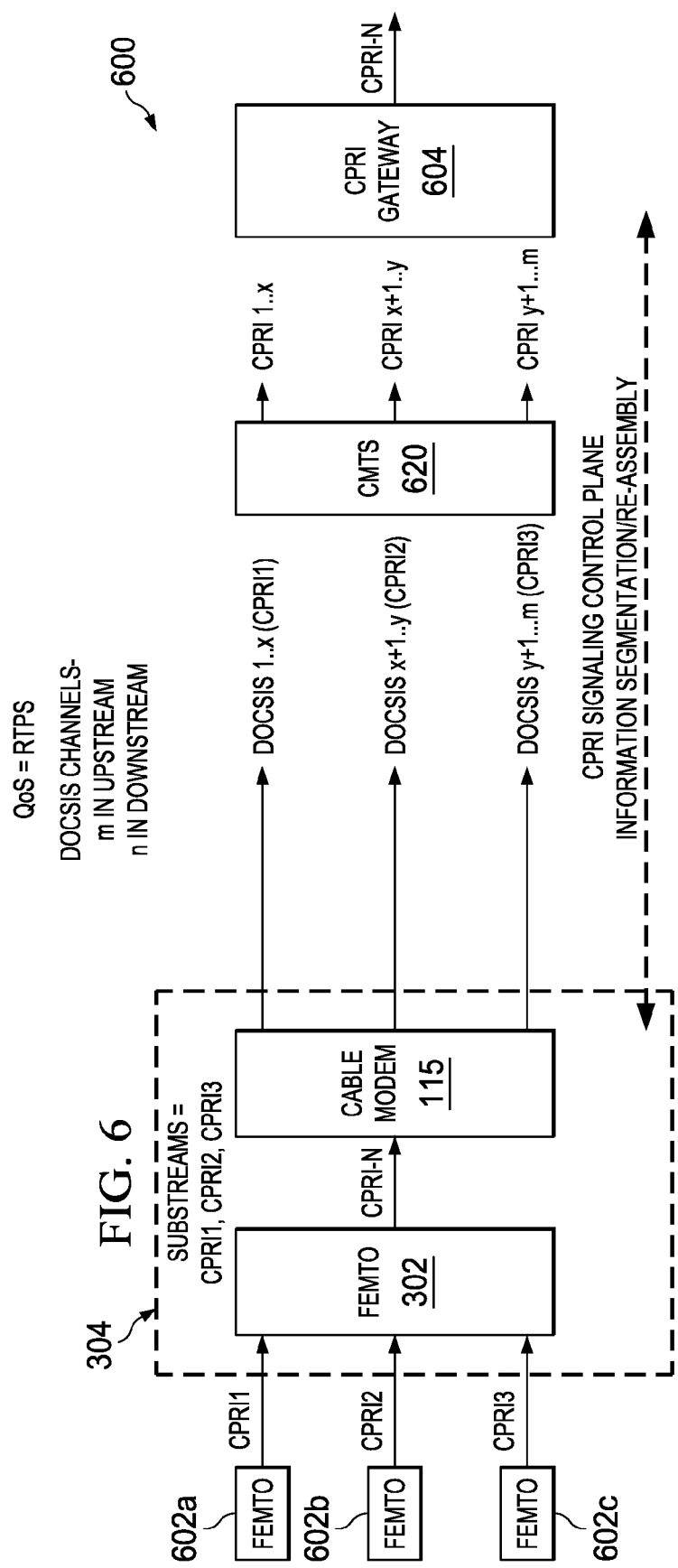
FIG. 6 is a simplified block diagram illustrating additional details that may be associated with another example use case of the communication system in which a DOCSIS control channel between a cable modem and a CPRI gateway may be used to communicate segmentation and re-assembly information.

FIG. 6 is a simplified block diagram 600 illustrating additional details that may be associated with another example use case of communication system 100, in which a DOCSIS control channel between a cable modem and a CPRI gateway may be used to communicate segmentation and re-assembly information. FIG. 6 includes femtocell 302, femtocells 602a-602c, cable modem 115, CMTS 620, and a CPRI gateway 604. In some embodiments, femtocell 302 and cable modem 115 may be integrated into a single access point 304, as illustrated in FIG. 6. As a preliminary matter, cable modem 115 may negotiate with CMTS 620 to obtain m upstream DOCSIS channels and n downstream DOCSIS channels based on the CPRI bitrate of femtocell 302 and the duplex nature of the air interface.

In operation, femtocell 302 may provide a single CPRI stream (CPRI-N) to cable modem 115, but CPRI-N may carry multiple streams (i.e., substreams CPRI1-CPRI3) from femtocells 602a-602c. Cable modem 115 can transmit CPRI-N to CMTS 620 over m upstream DOCSIS channels with a particular service class by mapping CPRI-N to DOCSIS channels based on the control word in CPRI-N. For example, the control word may identify CPRI-N as three substreams of variable length IQ data blocks. Cable modem 115 can treat each substream independently, but sharing the same service class within DOCSIS. Thus, cable modem 115 can map CPRI1-CPRI3 to m upstream DOCSIS channels with an RTPS service class. For example, CPRI3 may be mapped to DOCIS channels 1 . . . x, CPRI2 mapped to DOCSIS channel x+1 . . . y, and CPRI3 mapped to DOCSIS channels y+1 . . . m. In the upstream direction, cable modem 115 can segment CPRI-N, CMTS 620 can terminate DOCSIS and forward bitstreams CPRI 1 . . . x, CPRI x+1 . . . y, and CPRI y+1 . . . m to CPRI gateway 604. CPRI gateway 604 may combine the bitstreams and re-assemble CPRI-N. In the downstream (not shown), CPRI gateway 604 can separate CPRI-N into individual bitstream sets (e.g., CPRI 1 . . . x, CPRI x+1 . . . y, and CPRI y+1 . . . m), CMTS 620 can segment the bitstream sets and map them to n DOCSIS channels, and cable modem 115 can re-aggregate CPRI-N. A CPRI signaling channel 606 between cable modem 115 and CPRI gateway 604 can be used for communicating segmentation/re-assembly information.

Figure 7:
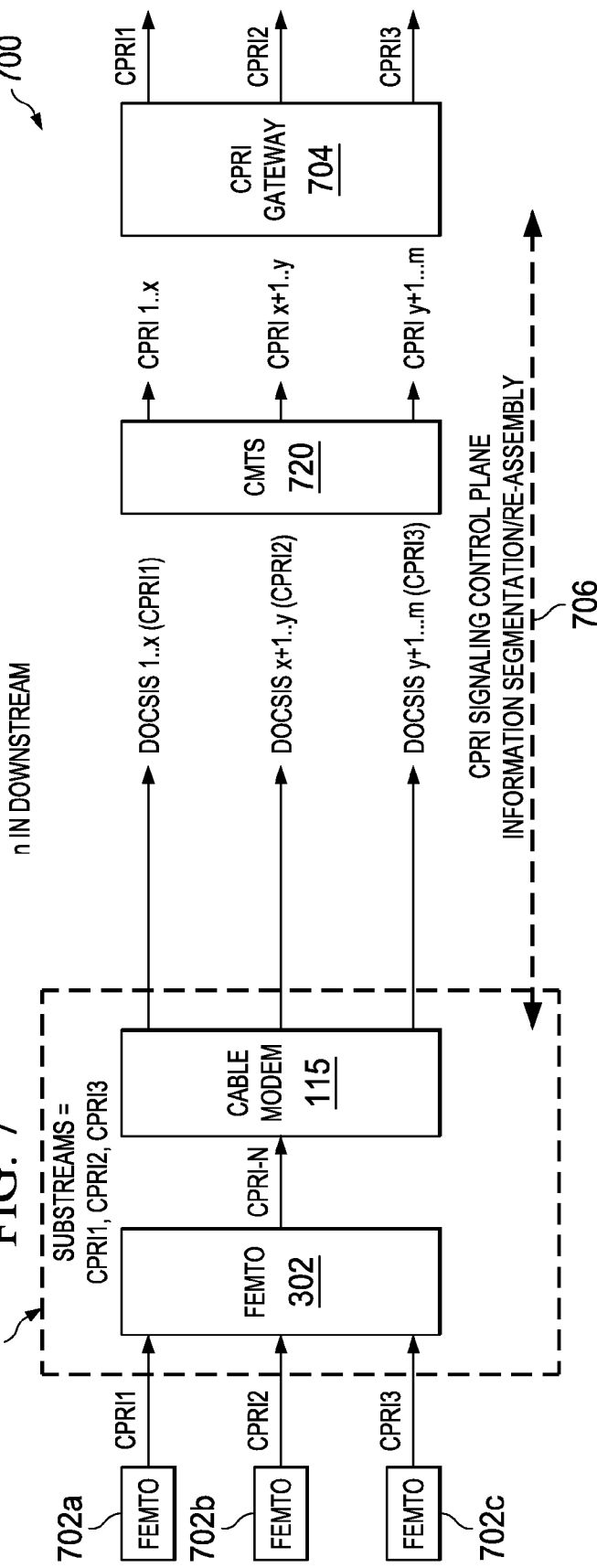
FIG. 7 is a simplified block diagram illustrating additional details that may be associated with another example use case of the communication system in which a DOCSIS control channel between a cable modem and a CPRI gateway may be used to communicate segmentation and re-assembly information.

FIG. 7 is a simplified block diagram 700 illustrating additional details that may be associated with another example use case of communication system 100, in which a DOCSIS control channel between a cable modem and a CPRI gateway may be used to communicate segmentation and re-assembly information. FIG. 7 includes femtocell 302, femtocells 702a-702c, cable modem 115, CMTS 720, and a CPRI gateway 704. In some embodiments, femtocell 302 and cable modem 115 may be integrated into a single access point 304, as illustrated in FIG. 7. As a preliminary matter, cable modem 115 may negotiate with CMTS 720 to obtain m upstream DOCSIS channels and n downstream DOCSIS channels based on the CPRI bitrate of femtocell 302 and the duplex nature of the air interface.

In operation, femtocell 302 may provide a single CPRI stream (CPRI-N) to cable modem 115, but CPRI-N may carry multiple streams (i.e., substreams CPRI1-CPRI3) from femtocells 702a-702c. Cable modem 115 can transmit CPRI-N to CMTS 720 over m upstream DOCSIS channels with a particular service class by mapping CPRI-N to DOCSIS channels based on the control word in CPRI-N. For example, the control word may identify CPRI-N as three substreams of variable length IQ data blocks. Cable modem 115 can treat each substream independently, but sharing the same service class within DOCSIS. Thus, cable modem 115 can map CPRI1-CPRI3 to m DOCSIS channels with an RTPS service class. For example, CPRI3 may be mapped to DOCIS channels 1 . . . x, CPRI2 mapped to DOCSIS channel x+1 . . . y, and CPRI3 mapped to DOCSIS channels y+1 . . . m. In the upstream direction, cable modem 115 can segment CPRI-N, CMTS 720 can terminate DOCSIS and forward bitstreams CPRI 1 . . . x, CPRI x+1 . . . y, and CPRI y+1 . . . m to CPRI gateway 704. CPRI gateway 704 may combine the bitstreams and re-assemble CPRI1-CPRI3. In the downstream (not shown), CPRI gateway 704 can separate CPRI1-CPRI3 into individual bitstream sets (e.g., CPRI 1 . . . x, CPRI x+1 . . . y, and CPRI y+1 . . . m), CMTS 720 can segment the bitstream sets and map them to n DOCSIS channels, and cable modem 115 can re-aggregate CPRI-N. A CPRI signaling channel 706 between cable modem 115 and CPRI gateway 704 can be used for communicating segmentation/re-assembly information.

Figure 8:
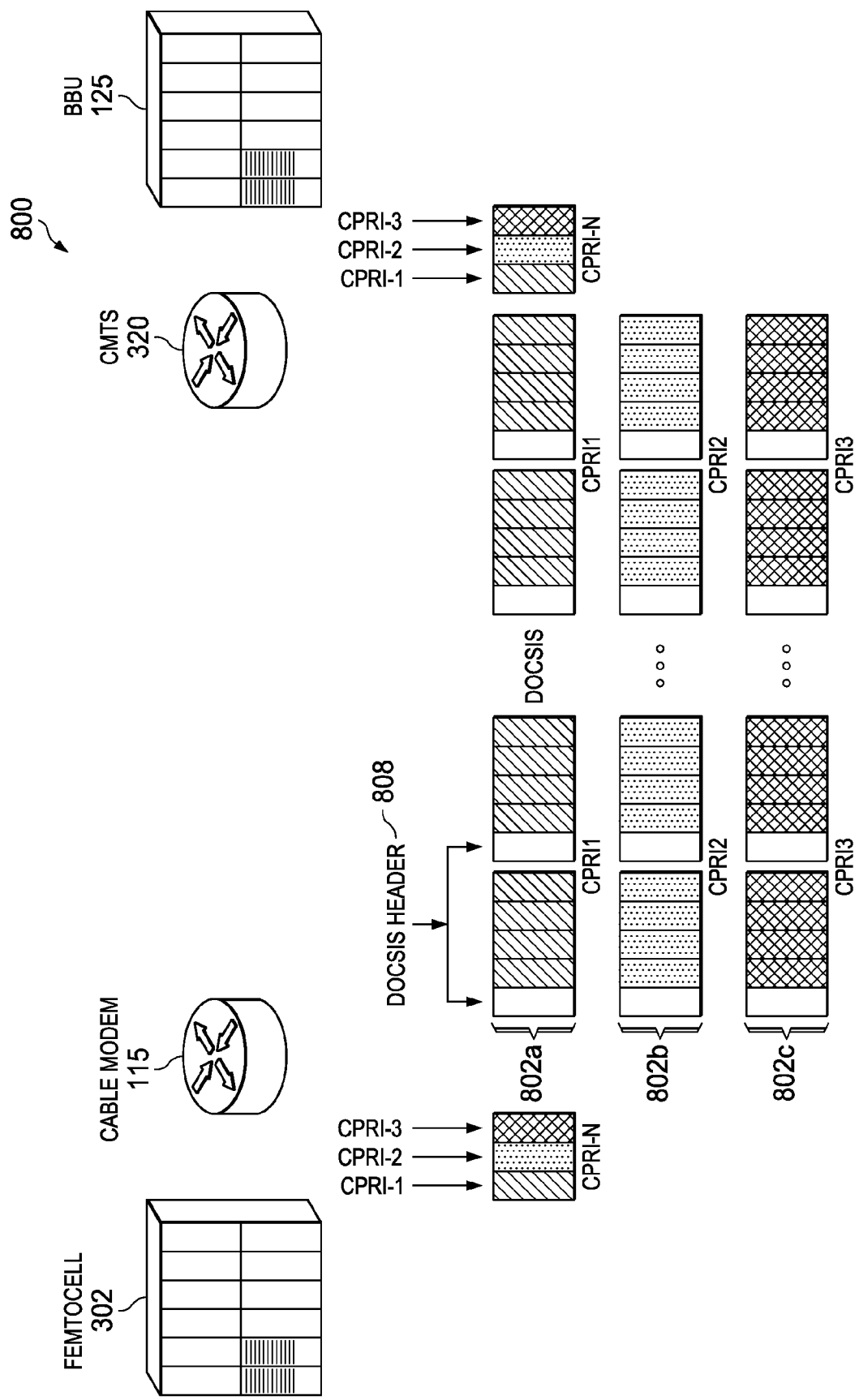
FIG. 8 is a simplified protocol diagram illustrating additional details that may be associated with an example use case of the communication system.

FIG. 8 is a simplified protocol diagram 800 illustrating additional details that may be associated with an example use case of communication system 100, such as the example use case of FIG. 3. FIG. 8 includes a femtocell 302, cable modem 115, CMTS 120, and baseband unit (BBU) 125. As noted already, cable modem 115 may negotiate with CMTS 320 to obtain m upstream DOCSIS channels and n downstream DOCSIS channels based on the CPRI bitrate of femtocell 302 and the duplex nature of the air interface.

In operation, femtocell 302 may provide a single CPRI stream (CPRI-N) to cable modem 115, where CPRI-N may include substreams CPRI-1, CPRI-2, and CPRI-3, for example. In general, cable modem 115 (e.g., RE interface module 206) can map each substream CPRI-1, CPRI-2, and CPRI-3 to m DOCSIS channels and transmit the substreams as DOCSIS packets 802a-802c, respectively, where each such packet is encapsulated with an appropriate DOCSIS headers 808. CMTS 120 (e.g., REC interface module 208) can decapsulate DOCSIS packets 802a-802c and reassemble substreams CPRI-1, CPRI-2, and CPRI-3 into CPRI-N before transmitting it to baseband unit 125.

Figure 9:
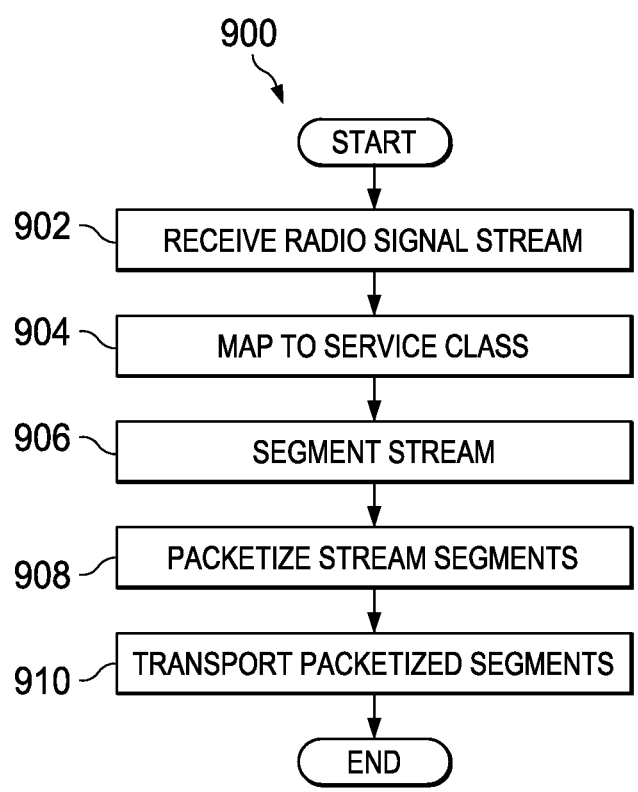
FIG. 9 is a simplified flow diagram illustrating potential operations that may be associated with example embodiments of the communication system.

FIG. 9 is a simplified flow diagram 900 illustrating potential operations that may be associated with example embodiments of communication system 100. In some embodiments, such operations may be implemented in an access point, a cable modem (e.g., RE interface module 206), a CMTS (e.g., REC interface module 208), and/or a CPRI gateway, for example. At 902 a radio signal stream may be received, using CPRI for example. At 904, the radio signal stream may be mapped to an appropriate service class over a backhaul link (e.g., between a cable modem and a CMTS). The service class may, for example, be selected based on a control word in the radio stream that identifies the type and/or content of the stream. The radio signal stream may be segmented at 906 and packetized at 908, and transported in packets through channels over the backhaul link at 910, while maintaining the order of the radio signal stream over the backhaul link.

Embodiments of communication system 100 may provide significant advantages, some of which have already been discussed. For example, embodiments of communication system 100 can allow operators to deploy femtocells that have limited intelligence, which are less expensive to manufacture. Communication system 100 may also allow small cells to be tightly integrated into mobile carrier networks, with a common cloud-based signal processing system. Strand-mounted picocells using a DOCSIS backhaul link may also be deployed in communication system 100.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures. Additionally, although described with reference to particular scenarios, where a particular module, such as a participation level module, is provided within a network element, these modules can be provided externally, or consolidated and/or combined in any suitable fashion. In certain instances, such modules may be provided in a single proprietary unit.

It is also important to note that the operations in the appended diagrams illustrate only some of the possible signaling scenarios and patterns that may be executed by, or within, communication system 100. Some of these operations may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   segmenting a radio signal stream into multiple sub-streams based on a control word included in the radio signal stream, the control word identifying a type of the radio signal stream;
   transporting the segmented radio signal stream in packets through channels over a backhaul link, wherein each of the sub-streams is transported over a different one of the channels; and
   providing a single collective control channel along the backhaul link, the control channel related to all of the channels collectively for communicating channel bundling information for the radio signal stream between network elements disposed at opposite ends of the backhaul link, the channel bundling information for facilitating segmentation of the radio signal stream into the sub-streams on one end of the backhaul link and reassembly of the sub-streams into the radio signal stream on the opposite end of the backhaul link.

2. The method of claim 1, wherein the network elements comprise a cable modem and a cable modem termination system.

3. The method of claim 1, wherein the backhaul link is a Data over Cable Service Interface Specification link.

4. The method of claim 1, wherein the radio signal stream is received using a Common Public Radio Interface.

5. The method of claim 1, wherein the radio signal stream comprises sub-streams and the sub-streams are transported through segmented channels over the backhaul link.

6. The method of claim 4, further comprising mapping the sub-streams transported through segmented channels into a second radio signal stream.

7. The method of claim 1, wherein the control word identifies the radio signal stream as synchronization such that the radio signal stream is treated as a fixed-length data segment and is assigned an unsolicited grant service (UGS) service class.

8. One or more non-transitory media that includes code for execution and when executed by one or more processors is operable to perform operations comprising:
   segmenting a radio signal stream into multiple sub-streams based on a control word included in the radio signal stream, the control word identifying a type of the radio signal stream;

transporting the segmented radio signal stream in packets through channels over a backhaul link, wherein each of the sub-streams is transported over a different one of the channels; and providing a single collective control channel along the backhaul link, the control channel related to all of the channels collectively for communicating channel bundling information for the radio signal stream between network elements disposed at opposite ends of the backhaul link, the channel bundling information for facilitating segmentation of the radio signal stream into the sub-streams on one end of the backhaul link and reassembly of the sub-streams into the radio signal stream on the opposite end of the backhaul link.

9. The media of claim 8, wherein the network elements comprise a cable modem and a cable modem termination system.

10. The media of claim 8, wherein the backhaul link is a Data over Cable Service Interface Specification link.

11. The media of claim 8, wherein the radio signal stream is received using a Common Public Radio Interface.

12. The media of claim 8, wherein the radio signal stream comprises sub-streams and the sub-streams are transported through segmented channels over the backhaul link.

13. The media of claim 8, wherein the operations further comprise mapping the sub-streams transported through segmented channels into a second radio signal stream.

14. The media of claim 8, wherein the control word identifies the radio signal stream as synchronization such that the radio signal stream is treated as a fixed-length data segment and is assigned an unsolicited grant service (UGS) service class.

15. An apparatus, comprising:
one or more processors operable to execute instructions such that the apparatus is configured for:

segmenting a radio signal stream into multiple sub-streams based on a control word included in the radio signal stream, the control word identifying a type of the radio signal stream;

transporting the segmented radio signal stream in packets through channels over a backhaul link, wherein each of the sub-streams is transported over a different one of the channels; and providing a single collective control channel along the backhaul link, the control channel related to all of the channels collectively for communicating channel bundling information for the radio signal stream between network elements disposed at opposite ends of the backhaul link, the channel bundling information for facilitating segmentation of the radio signal stream into the sub-streams on one end of the backhaul link and reassembly of the sub-streams into the radio signal stream on the opposite end of the backhaul link.

16. The apparatus of claim 15, wherein the network elements comprise a cable modem and a cable modem termination system.

17. The apparatus of claim 15, wherein the backhaul link is a Data over Cable Service Interface Specification link.

18. The apparatus of claim 15, wherein the radio signal stream is received using a Common Public Radio Interface.

19. The apparatus of claim 15, wherein the radio signal stream comprises sub-streams and the sub-streams are transported through segmented channels over the backhaul link.

20. The apparatus of claim 15, wherein the apparatus is further configured for mapping the sub-streams transported through segmented channels into a second radio signal stream.

* * * * *